(12) United States Patent
Baldan et al.

(10) Patent No.: US 8,631,243 B2
(45) Date of Patent: Jan. 14, 2014

(54) BIOMETRICS BASED IDENTIFICATION (75) Inventors: Simone Baldan, Rome (IT); Paolo Vendittelli, Rome (IT)

(73) Assignee: Telecom Italia S.p.A., Milan (IT)

( * ) Notice: Subject to any disclaimer, the term of this patent is extended or adjusted under 35 U.S.C. 154(b) by 446 days.

(21) Appl. No.: 12/810,304

(22) PCT Filed: Dec. 24, 2007

(86) PCT No.: PCT/EP2007/011421
§ 371 (c)(1),
(2), (4) Date: Sep. 22, 2010

(87) PCT Pub. No.: WO2009/080089
PCT Pub. Date: Jul. 2, 2009

(65) Prior Publication Data
US 2011/0010558 A1    Jan. 13, 2011

(51) Int. Cl.
*G06F 21/00*    (2013.01)
*G06F 21/32*    (2013.01)

(52) U.S. Cl.
CPC ..................................... *G06F 21/32* (2013.01)
USPC ........................... 713/186; 382/115; 382/116

(58) Field of Classification Search
None
See application file for complete search history.

(56) References Cited

U.S. PATENT DOCUMENTS

2002/0168093 A1* 11/2002 Sanders et al. ................ 382/125

FOREIGN PATENT DOCUMENTS

| EP | 1 612 714 A2 | 1/2006 |
|---|---|---|
| WO | WO-82/01434 | 4/1982 |
| WO | WO-03/007125 A2 | 1/2003 |

OTHER PUBLICATIONS

Moon, Y.S.; Ho, H.C.; Ng, K.L.; Wan, S.F.; Wong, S.T.; , "Collaborative fingerprint authentication by smart card and a trusted host," Electrical and Computer Engineering, 2000 Canadian Conference on , vol. 1, no., pp. 108-112 vol. 1, 2000 doi: 10.1109/CCECE.2000. 849680.*

Zhe Jin; Teoh, A.B.J.; Thian Song Ong; Connie Tee; , "Generating revocable fingerprint template using minutiae pair representation," Education Technology and Computer (ICETC), 2010 2nd International Conference on , vol. 5, no., pp. V5-251-V5-255, Jun. 22-24, 2010 doi: 10.1109/ICETC.2010.5529773.*

"NIST Biometric Image Software," The National Institute of Standards and Technology, http://www.nist.gov/itl/iad/ig/nbis.cfm, pp. 1-3, (May 14, 2010).

Cappelli et al., "Performance Evaluation of Fingerprint Verification Systems," IEEE Transactions on Pattern Analysis and Machine Intelligence, vol. No. 28, No. 1, pp. 3-18, (2006).

(Continued)

*Primary Examiner* — Ashok Patel
*Assistant Examiner* — Alexander Lagor
(74) *Attorney, Agent, or Firm* — Finnegan, Henderson, Farabow, Garrett & Dunner, L.L.P.

(57) ABSTRACT

A biometrics template matching method includes the steps of: providing a reference biometric template and a candidate biometric template, each including position data and orientation data of a respective plurality of minutiae; comparing the orientation data of each minutia from the candidate template with the orientation data of each minutia from the reference template; when the orientation data of a selected pair differ by no more than a first threshold, determining a displacement vector representative of the difference in position data of the selected pair of minutiae; determining the maximum number of displacement vectors that differ from each other by less than a second threshold; if the maximum number of displacement vectors is less than a third threshold, returning a mismatch, otherwise returning a match.

18 Claims, 6 Drawing Sheets

(56) References Cited

OTHER PUBLICATIONS

Osborne et al., "A JC-BioAPI Compliant Smart Card With Biometrics for Secure Access Control," Kittler and Nixon (Eds.), AVBA, LNCS 2688, pp. 903-910, (2003).

Gil et al., Fingerprint Verification System Involving Smart Card, P.J. Lee and C.H. Lim (Eds.): ICISC 2002, LNCS 2587, pp. 510-524, (2003).

International Search Report from the European Patent Office for International Application No. PCT/EP2007/011421 (Mail date Sep. 3, 2008).

* cited by examiner

BIOMETRICS BASED IDENTIFICATION

CROSS REFERENCE TO RELATED APPLICATION

This application is a national phase application based on PCT/EP2007/011421, filed Dec. 24, 2007, the content of which is incorporated herein by reference.

BACKGROUND OF THE INVENTION

1. Field of the Invention

The present invention relates generally to the field of biometrics based identification, and more particularly to a biometrics template matching method, a biometrics based identification method, device and system, as well as a portable data carrier with processor and a secured electronic system.

2. Description of the Related Art

There is an increasing need for univocally identifying a person before granting or refusing access to a secured environment, e.g. for securing access to sensitive data or applications in computers and computer networks, for securing access to restricted areas, for securing transactions, for digitally signing electronic documents and so on.

Identification through use of biometrics ("what you are"), i.e. of physical or behavioural characteristics that are permanent and univocal to each individual, has become widespread because of its higher resistance to fraud attempts than identification through a token ("what you have") or a password or similar ("what you know"). Biometric characteristics comprise i.a. fingerprints, iris or retina, hand or face geometry, speech, signature, writing and typewriting.

The following discussion will be focused on fingerprints. It is however understood that the underlying principles of the invention can also be applied to other biometric characteristics, particularly geometric characteristics such as iris, retina, hand and face geometry.

To make use of fingerprints for identification, a reference image of the fingerprint of a person is initially taken, and a so-called enrolment template of a few representative features thereof, called minutiae, is stored for later comparison or matching with so-called candidate templates from fingerprints each time detected from the purported person.

To increase safety against the enrolment template being copied for fraudulent use, instead of maintaining a central database of fingerprints from registered users of a secured environment, the enrolment template can be stored in a portable data carrier.

A user to be identified thus needs to present both the portable data carrier and his/her finger to an identification device, thus embodying a two factor identification.

In "Match-On-Card" biometrics based identification systems, the comparison between enrolment template and candidate template is performed by the portable data carrier itself, in the form of a smart card with microprocessor. This further enhances the resistance of the identification system, in that there is no need for the enrolment template to be released by the smart card.

WO 03/007125 discloses a device for securely communicating with a server, comprising a biometric sensor, a processor, and a smart card comprising matching logic and a secure data storage module containing stored biometric data and sensitive data such as an encryption key. A biometric sample from the sensor is compared with the stored biometric data by the smart card matching logic. If they match, the processor accedes the sensitive data from the smart card and communicates with the server using the sensitive data. WO 03/007125 generally relies on known matching methods, such as statistical methods, piecewise linear classifiers, and rule-based methods.

The biometric characteristics are complex and thus represented by large electronic representations (images, voice signals etc.), and their detection, though preserving the uniqueness of the biometric characteristic itself, is subject to changes and errors. For example, in the case of fingerprints, a same user's finger will hardly ever be pressed exactly in the same position on the biometric detector. Consequently, two biometric templates taken from two detections of a same user's finger may not contain the same minutiae, and the minutiae present in both templates may differ in position and orientation. Known matching methods then typically involve a rotation and translation of one template with respect to the other, in an attempt to superimpose the templates as if they were taken from fingers in a same position. Such alignment step is followed by a comparison of pairs of minutiae from the two templates. Biometric template matching thus generally requires a great deal of memory and computational resources to carry out the alignment step.

M. Osborne and N. K. Ratha, in "A JC-BioAPI Compliant Smart Card with Biometrics for Secure Access Control", J. Kittler and M. S. Nixon (Eds.): AVBPA 2203, LNCS 2688, pp. 903-910, 2003, disclose a fingerprint-based match-on-card application. The document recognises that a matching algorithm run on a smart card faces significant constraints because of the restricted resources of the smart card, especially the non-availability of floating point coprocessors. Accordingly, the matching algorithm should only use limited amounts of dynamic memory and as few computational cycles as possible, and the biometric feature extraction should be performed outside of the smart card. According to the document, the JavaCard-BioAPI standard developed by the Java Card Forum allows securely enrolling a reference biometrics on the card, and later performing a candidate biometrics validation without exposing the reference data outside of the card. The actual matching algorithm is left to independent development in the industry.

Y. Gil et al., in "Fingerprint Verification System Involving Smart Card", P. J. Lee and C. H. Lim (Eds.): ICISC 2002, LNCS 2587, pp. 510-524, 2003, disclose a match-on-card system using a multi-resolution accumulator array designed to meet the processing power and memory space specification of the smart cards. The system of the document involves, at the verification phase: an image preprocessing step wherein the fingerprint image is refined against the image distortion obtained from a sensor; a minutiae extraction step wherein a template file is created, including the position, direction and type of some of the minutiae; and a minutiae matching step wherein the input fingerprint is compared with the enrolled fingerprint. The minutiae matching step comprises an alignment stage wherein transformations such as translation and rotation between two fingerprints are estimated, and two minutiae are aligned according to the estimated parameters; and a matching stage wherein two minutiae are compared based on their position, direction and type, and a matching score is computed. In the alignment stage, a discretized transformation comprising a rotation and a translation from each minutia of an input fingerprint image into each minutia of an enrolled fingerprint image is found, and the occurrences of each transformation are counted. In order to reduce the memory space requirements of the algorithm to allow implementation in a smart card, the document proposes to reiterate the alignment stage from a coarser resolution to finer resolution(s) of the transformation space, centred around the most accumulated transformation of the preceding iteration. This is done at the expenses of a greater number of instructions being performed, i.e. at the expenses of a longer execution time. Furthermore, the search for the transformation requires trigonometric functions, that are not available in standard smart cards.

SUMMARY OF THE INVENTION

The technical problem at the basis of the present invention is to provide a matching method that can be run in a resource constrained environment such as a smart card, so as to implement an efficient match-on-card biometrics based identification system and method.

The Applicant has perceived that the above problem may be solved by reducing the mutual rotation allowed for two biometric templates to be recognized as matching. In other words, a constraint is imposed on the degree the user is allowed to rotate the position of the biometric characteristic, such as his/her finger, during identification with respect to the position of the user's finger at the time of enrolment.

In a first aspect thereof, the invention relates to a biometric template matching method, comprising the steps of:
  providing a reference biometric template and a candidate biometric template, each template comprising position data and orientation data of a respective plurality of minutiae,
  comparing the orientation data of each minutia from the candidate biometric template with the orientation data of each minutia from the reference biometric template,
  when the orientation data of a selected pair of one minutia from the candidate biometric template and one minutia from the reference biometric template differ by no more than a first threshold, determining a displacement vector representative of the difference in position data of the selected pair of minutiae,
  determining the maximum number of displacement vectors that differ from each other by less than a second threshold,
  comparing said maximum number of displacement vectors with a third threshold, and
  if said maximum number of displacement vectors is less than said third threshold, returning a mismatch, otherwise returning a match.

By first performing the orientation comparison between minutiae, the need for rotating one template with respect to the other is advantageously avoided, in particular the need for using trigonometric functions is avoided.

In a further aspect thereof, the invention relates to a biometrics based identification method, comprising an enrolment step comprising providing at least one reference biometric template of a user, and an identification step, said identification step comprising the steps of:
  obtaining at least one candidate biometric template representative of at least one biometric characteristic of a purported user,
  comparing the at least one reference template and the at least one candidate template,
  in case of a match, granting the purported user access to a secured environment, and
  in case of a mismatch, denying the purported user access to secured environment,
the said step of comparing comprising the above matching method.

In a further aspect thereof, the invention relates to a portable data carrier with processor, comprising modules adapted to carry out the steps of the above matching method.

In a further aspect thereof, the invention relates to a biometrics based identification system, comprising a biometrics based identification device and at least one portable data carrier with processor, adapted to carry out the steps of the above identification method.

In a further aspect thereof, the invention relates to a biometrics based identification method, comprising an enrolment step comprising storing at least one reference biometric template of a user in a portable data carrier with processor, and an identification step, said identification step comprising the steps of:
  bringing into electronic communication said portable data carrier with processor with a biometrics based identification device,
  providing to said portable data carrier with processor a candidate biometric template of a purported user,
  comparing one reference template and said candidate template within said portable data carrier with processor,
  in case of a match, communicating at least one reference template from said portable data carrier with processor to said biometrics based identification device, and comparing said at least one reference template with at least one candidate biometric template within said biometrics based identification device,
  in case of a match, granting the purported user access to a secured environment, and
  in case of a mismatch, denying the purported user access to secured environment.

BRIEF DESCRIPTION OF THE DRAWINGS

Further features and advantages of the present invention shall become clearer from the following detailed description of some preferred embodiments thereof, given merely as a non-limiting example with reference to the attached drawings, wherein.

DETAILED DESCRIPTION OF THE INVENTION

Figure 1:
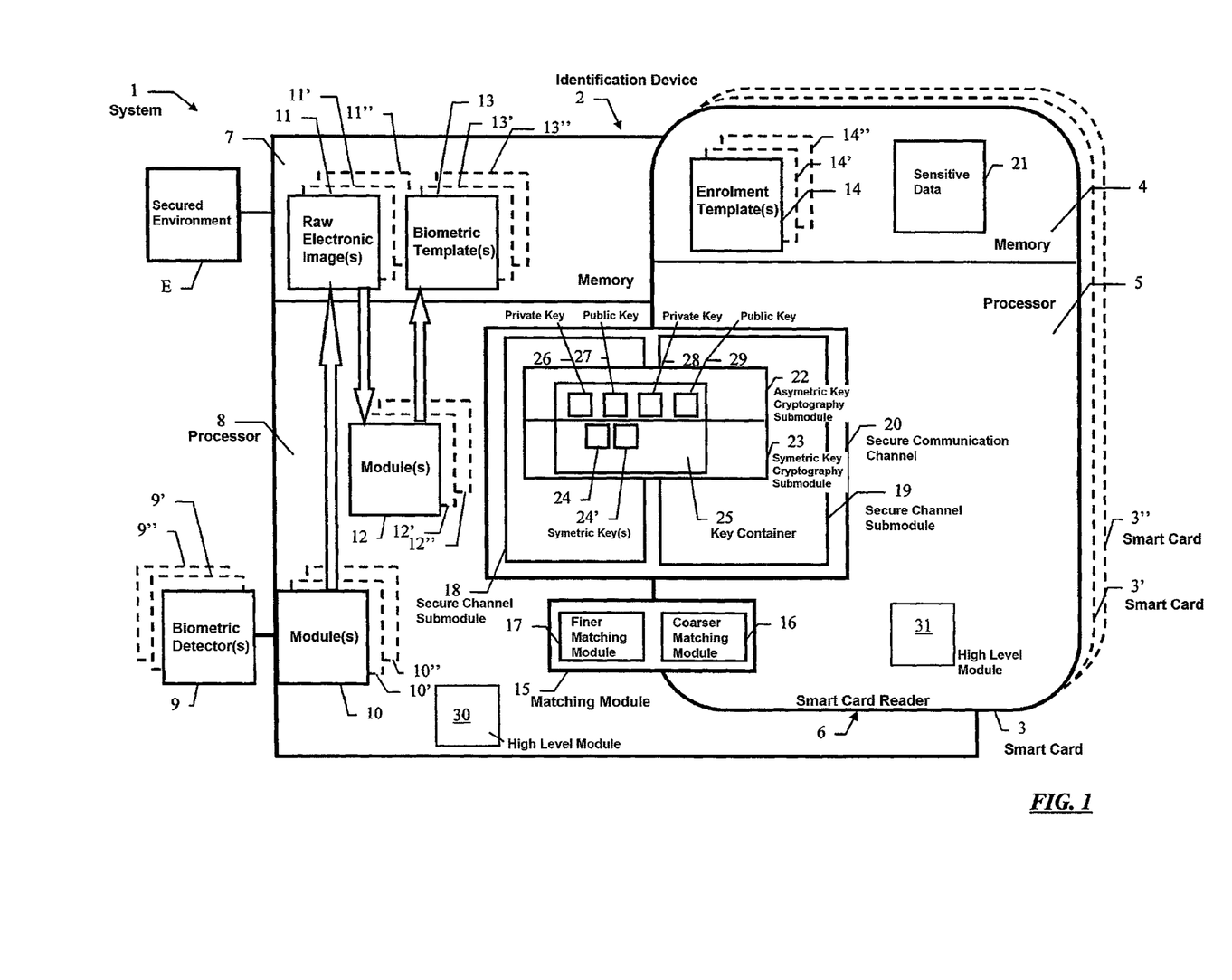
FIG. 1 shows a block diagram of a preferred embodiment of a biometrics based identification system according to the invention.

In FIG. 1 a block diagram of a preferred embodiment of a biometrics based identification system 1 according to the invention is shown.

System 1 comprises a biometrics based identification device 2 and at least one portable data carrier with processor 3, 3', 3" . . . , such as a smart card of the microprocessor card type, e.g., a SIM or USIM. For the sake of brevity, portable data carrier with processor 3 will be often referred to as smart card 3 hereinafter. Smart card 3 comprises a memory 4 and a processor 5.

Biometrics based identification device 2 is part of, or capable of electronically communicating with, a secured environment E, to grant or deny access to secured environment E to a purported user upon identification through the biometrics based identification system 1.

Secured environment E can be any of a variety of environments, e.g. a computer or computer network comprising sensitive data such as personal data or sensitive applications such as financial transactions, applications requiring electronic signature of documents, administering applications such as for configuring the computer or computer network or a communication base station, an electronic device such as a mobile telephone or similar, an automatic teller machine, a restricted area such as a lab or a bank, and similar.

Biometrics based identification device 2 is capable of electronically communicating with the at least one smart card 3, through a smart card reader 6, and it comprises a memory 7 and a processor 8.

Furthermore, biometrics based identification device 2 comprises or is capable of being brought into electronic communication with at least one biometric detector 9, 9', 9", .... In a simple embodiment, biometric detector 9 is a fingerprint sensor. Supplemental biometric detectors 9', 9", ..., if provided for, may detect different biometric characteristics.

The processor 8 of the biometrics based identification device 2 comprises at least one module 10, 10', 10", ... adapted to drive a respective biometric detector 9, 9', 9", ... in order to acquire a respective raw electronic representation 11, 11', 11", ... of the biometric characteristic, and to provide the raw electronic representation(s) 11, 11', 11" ... to memory 7 of identification device 2. In particular, a raw electronic image 11 of a fingerprint is acquired when a user's finger is pressed on sensor 9. Raw electronic image 11 may advantageously be in any of a wide variety of standard image formats, such as BMP, JPG, GIF and similar.

When fingerprint sensor 9 is a separate device from biometrics based identification device 2 and has its own driver, sensor drive module 10 can be module AES4K from AuthenTec Inc., Melbourne, Fla., U.S.A., and can communicate with the driver of fingerprint sensor 9 e.g. through the Microsoft Windows™ driver subsystem.

The processor 8 of the biometrics based identification device 2 further comprises at least one module 12, 12', 12", ... adapted to process the respective raw electronic representation 11, 11', 11", ... and provide a respective candidate biometric template 13, 13', 13", .... More specifically, image processing module 12 is adapted to perform image enhancement or supplement any image enhancement performed in fingerprint sensor 9, such as for eliminating or filtering acquisition errors or noise due for example to ambient light, to dirt on the sensitive surface, to the sensitive surface non being flat, and similar. Image processing module 12 is further adapted to extract the most significant features from the fingerprint, such as the points where the finger ridges branch, concentrate or interrupt, called minutiae, and store in memory 7 of identification device 2 the candidate biometric template 13, that is a data structure comprising representative data of each minutia.

As further detailed below, in a preferred embodiment of the invention candidate template 13 more specifically comprises position data in the form of in-plane orthogonal coordinates x, y and orientation data t in the form of an in-plane angle with respect to axis x. Orientation data t represents the general direction of the fingerprint ridges in the surroundings of the minutia point, as specified by NIST—National Institute of Standards and Technology.

Image processing module 12 may use the minutiae extraction algorithms from NIST, and it can comprise module MinDetect, an an opensource program available at the NIST webpage Supplemental candidate templates 13', 13" ..., if provided for, may comprise the same kind of data as candidate template 13, or different kind of data representing minutiae taken from different biometrics of the user, such as the iris, retina, hand, face, as well as speech, signature, writing, and typewriting. For example, supplemental candidate templates 13', 13" ... may comprise 3D position data of a face template, or time and duration of peaks or frequencies of a voice signal.

Memory 4 of smart card 3 is adapted to securely store at least one reference or enrolment template 14, 14', 14''', .... Enrolment template(s) 14, 14', 14", ... is (are) obtained similarly to candidate template(s) 13, 13', 13", ... at an initialization or enrolment step, when a user is personally identified by an organization supervising the secured environment E.

Enrolment template(s) 14, 14', 14", ... comprise(s) the same kind of data and data structure as candidate template(s) 13, 13', 13", .... More specifically, enrolment template 14 comprises position data in the form of in-plane orthogonal coordinates x, y and orientation data t in the form of a (quantized) in-plane angle with respect to axis x.

Biometrics based identification system 1 comprises a matching module 15. For reasons that will appear clearer below, matching module 15 preferably comprises a coarser matching module 16 within processor 5 of smart card 3 and a finer matching module 17 within processor 8 of identification device 2.

Matching module 15, and in particular coarser matching module 16 of smart card 3, is adapted to compare candidate template 13 with enrolment template 14. Matching module 15, and in particular finer matching module 17 of identification device 2, may also be adapted to compare supplemental candidate templates 13', 13", ... with supplemental enrolment templates 14', 14", ..., and/or to more finely compare candidate template 13 with enrolment template 14.

As will be more clearly described hereinafter, when finer matching module 17 is provided within identification device 2, it may only accede the enrolment template(s) 14, 14', 14", ... stored in memory 4 of smart card 3 after coarser matching module 16 of smart card 3 returns a match.

Also to this end, processor 8 of biometrics based identification device 2 and processor 5 of smart card 3 each comprise a secure channel submodule 18, 19 that cooperate with each other to establish a secure communication channel 20 between identification device 2 and smart card 3.

Secure communication channel 20 implements cryptography to encrypt the data exchanged between identification device 2 and smart card 3, and ensures that each communication session between identification device 2 and smart card 3 is unique. The exchanged data includes the match or mismatch as determined by coarser matching module 16 of smart card 3, and may include the enrolment templates 14, 14', 14", ..., as well as any other sensitive data 21 stored in memory 4 of smart card 3, such as user personal data, digital certifications, user loyalties that govern access to the secured environment E, and similar.

Secure channel submodule 18 of the identification device 2 may implement the Microsoft Cryptography Service Provider, while secure channel submodule 19 of the smart card 3 may implement the Java Cryptography Extension. They may cooperate with each other by using the PKCS—Public-Key Cryptography Standards.

In a preferred embodiment, secure communication channel 20 comprises an asymmetric key cryptography submodule 22, preferably using the RSA standard, as well as a symmetric key cryptography submodule 23, preferably using the DES—Data Encryption Standard.

The asymmetric key cryptography or RSA submodule 22 is used to securely exchange a symmeyric key 24 of the symmetric key cryptography or DES submodule 23.

Symmetric key cryptography or DES submodule 23 is used in turn to securely exchange data between identification device 2 and smart card 3.

More specifically, secure communication channel 20, comprises a key container 25, that can be the key container described by the CSP—Crypto Service Provider of Microsoft Windows, or any other component typically based on the PKCS°11 standard of Unix.

Key container 25 is adapted to store a session key 24, that is the symmetric key 24 of the DES submodule 23, a private key 26 and a public key 27 of the identification device 2 and possibly a private key 28 and a public key 29 of the smart card 3, that are the asymmetric keys of the RSA submodule 22.

Finally, processor 8 of biometrics based identification device 2 comprises a high level module 30 adapted to interface with secured environment E and with smart card 3, as well as to coordinate the above described various modules of processor 8.

High level module 30 of identification device 2 is preferably implemented as a dynamic library Win32.

Similarly, processor 5 of smart card 3 comprises a high level module 31 adapted to interface with biometrics based identification device 2, to coordinate the above described various modules of processor 5, and to lock/unlock access to its own file system and memory 4.

High level module 31 of smart card 3 is preferably implemented as Java Card Applet for the Java Card OS, and provides several APDU—Application Protocol Data Unit for interfacing with biometrics based identification device 2.

Figure 2:
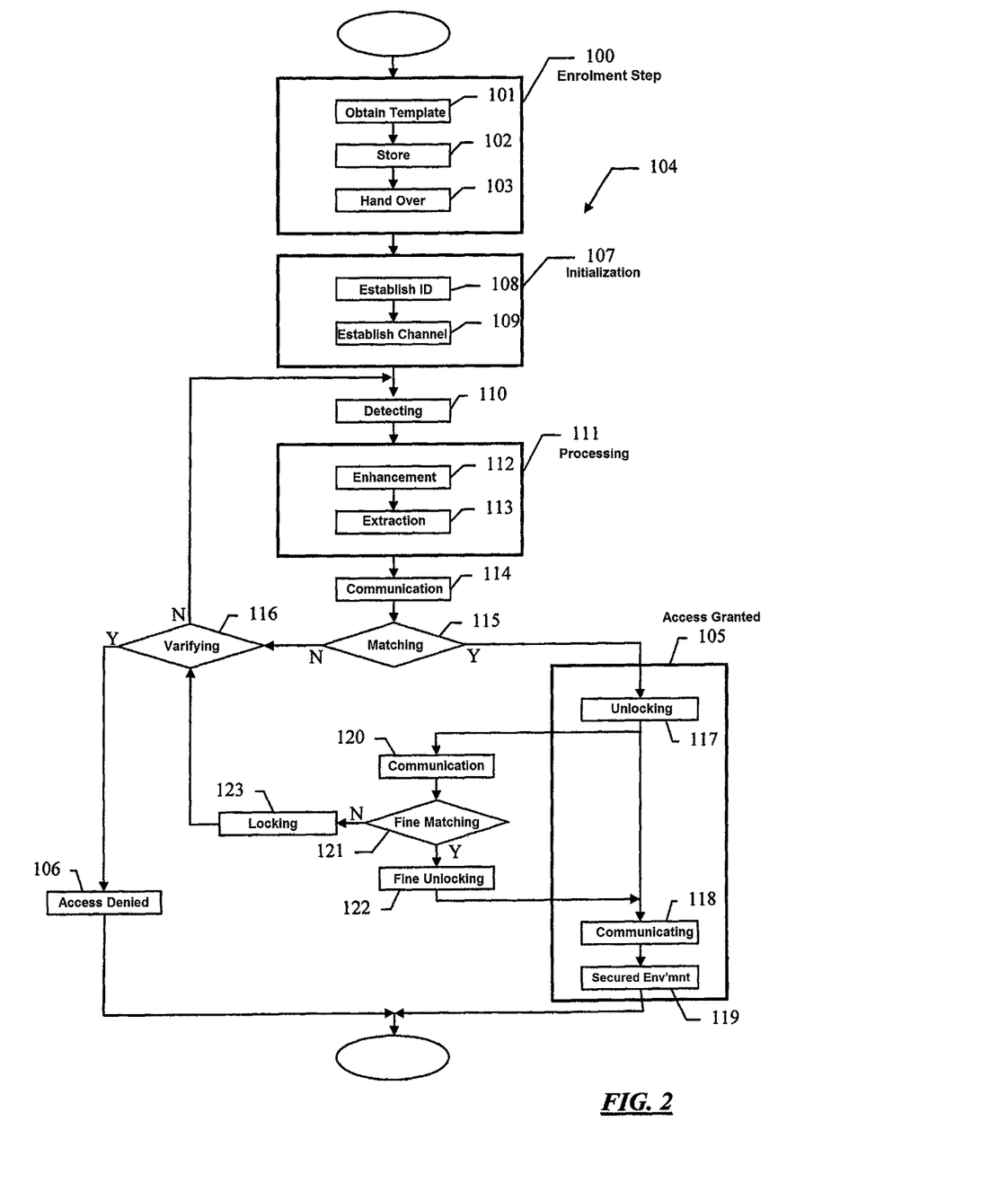
FIG. 2 shows a flow chart of a preferred embodiment of a biometrics based identification method according to the invention.

The above described biometrics based identification system 1 is particularly suitable to perform a biometrics based identification method according to the invention, a preferred embodiment whereof is described below with reference to FIG. 2.

In an enrolment step 100, one or more biometric reference or enrolment template(s) 14, 14', 14", . . . is (are) obtained (step 101) from a user who is personally identified by an organization supervising the secured environment E, and is (are) stored within memory 4 of smart card 3 (step 102). Smart card 3 is handed over to the user (step 103).

Step 101 of obtaining enrolment template(s) is not fully described herein, and can be carried out in a number of ways known in the art. Reference may in any case be made to similar steps 110-113 of the identification step 104, described below.

Enrolment step 100 is performed once for each user/smart card 3.

After enrolment step 100, an identification step 104 is carried out each time a purported user is to be identified in order to grant (step 105) or deny (step 106) him/her access to secured environment E. The identification step 104 is detailed hereinbelow.

In an initialization step 107, the biometrics based identification system 1 is established (step 108) by bringing portable data carrier with processor or smart card 3 storing the template(s) 14, 14', 14", . . . into electronic communication with biometrics based identification device 2, namely the user presents the smart card 3 to reader 6; and the identification system 1 establishes secure communication channel 20 (step 109).

Step 109 of establishing secure communication channel 20 is not mandatory, but it is preferably provided because preferably session key 24, private key(s) 26 (28), and public key(s) 27 (29) are generated at each session. At each session, secure communication channel 20 initializes key container 25.

Secure channel submodule 18 of identification device 2 generates its private key 26 and its public key 27, and communicates public key 27 to secure channel submodule 19 of smart card 3. Secure channel submodule 19 of smart card 3 generates session key 24, encrypts session key 24 with the identification device public key 27 and communicates encrypted session key 24' to secure channel submodule 18 of identification device 2. Finally, secure channel submodule 18 of identification device 2 decrypts session key 24 from encrypted session key 24' by using its private key 26.

Secure channel submodule 19 of smart card 3 may also generate its private key 28 and its public key 29, and communicate public key 29 to secure channel submodule 18 of identification device 2.

In a biometric characteristic detecting step 110, at least one biometric characteristic of the purported user of secured environment E is detected by biometric detector(s) 9, 9', 9", . . . and sensor drive module(s) 10, 10', 10" and the raw electronic representation(s) 11, 11', 11", . . . thereof is (are) generated. This step may comprise the purported user pressing his/her finger on fingerprint sensor 9, speaking in a microphone or similar.

In a processing step 111, the raw electronic representation(s) 11, 11', 11", . . . is (are) processed by processing module(s) 12, 12', 12", . . . and at least one candidate template 13, 13', 13", . . . is (are) generated. Processing step 111 may comprise an image enhancement step 112 and it comprises a minutiae extraction step 113.

Candidate template 13 is thereafter compared with enrolment template 14 by matching module 15 in a matching step 115 that preferably uses a matching or comparison method that will be discussed below.

Matching step 115 is preferably at least partly performed within smart card 3, by its matching module 16. In such a case, therefore, in a previous template communication step 114, candidate template 13 is communicated to smart card 3, preferably through secure communication channel 20 by encrypting it with session key 24.

As a less preferred alternative, enrolment template 14 is communicated to identification device 2, again through secure communication channel 20 by encrypting it with session key 24, and matching step 115 is performed within identification device 2, by its matching module 17. As a still less preferred alternative, matching is performed by one of the smart card 3 or the identification device 2 with direct access to the memory of the other of the smart card 3 or the identification device 2, template communication step 114 being dispensed with.

In case of a match, access to secured environment E may be immediately granted (step 105). In case of a mismatch, access to secured environment E may be immediately denied (step 106). Alternatively, in case of a mismatch, biometric characteristic detecting step 110, processing step 111, template communication step 114 and matching step 115 may be repeated, preferably no more than a selected number of times, as verified by a step 116 of comparing a number of attempts with a threshold.

In case of a match, a step 117 of unlocking smart card functions and applications may be provided for. The smart card applications may include a digital signature application, an encryption application, a mobile communication application and similar.

More specifically, functions and applications of smart card 3 may comprise for example an authentication function compliant with standard 802.11, in particular an EAP—Extensible Authentication Protocol such as EAP-SIM when the secured environment E is a GSM or mobile communication network, or such as EAP-TLS (Transport Layer Security) when secured environment E is a computer or computer network, and smart card 3 is used for exchange of digital certificates such as for example for securing e-mail messages, for securing access to the network or to the computer or computer network applications; a contactless authentication application based on RFID—Radio Frequency Identification, when secured environment E is a restricted area, etc.

Access granting step 105 may comprise communicating sensitive data 21 (step 118) from the smart card 3 to the identification device 2 preferably through secure channel 20, by encrypting sensitive data 21 with session key 24, and forwarding the sensitive data 21 from the identification device 2 to the secured environment E (step 119).

In a particularly preferred embodiment, the biometrics based identification method comprises a two level comparison of biometric templates. Accordingly, matching step 115, preferably carried out by matching module 16 of smart card 3 that has more limited memory and computational resources, is a first or coarser matching step 115.

In case of a match of first matching step 115, granting access step 105 is accordingly not immediately performed. Rather, unlocking step 117 is performed as a first or coarser unlocking step, wherein only a limited subset of data and applications are unlocked within smart card 3.

In case of a match of first or coarser matching step 115, a second or fine matching step 121 is performed by matching module 17 of identification device 2, that has more memory and computational capabilities. Fine matching step 121 can comprise a finer comparison between the same candidate template 13 and enrolment template 14 already used by the smart card 3 in coarser matching step 115, or it can comprise one or more comparisons between supplemental pairs of enrolment templates 14', 14" ... and candidate templates 13', 13" ..., for examples between templates of more complex biometric data, such as iris data, voice data, and similar.

In particular, in case of a match outcome of first or coarser matching step 115, the smart card 3 may only unlock access to its file system in step 117, and the identification device 2 may thus accede to the enrolment template 14 and/or to a supplemental enrolment template 14', 14", ..., or, a second template communication step 120 can be performed, wherein the enrolment template 14 or a supplemental enrolment template 14', 14", ... is communicated from smart card 3 to identification device 2, preferably through secure communication channel 20 by encrypting it with session key 24.

In case of a match outcome of fine matching step 121, step 105 of granting access to secured environment E is totally performed, i.e. steps 118 and 119 are performed, and furthermore a second or fine unlocking step 122 may be performed, wherein all data and applications of the smart card 3 are unlocked.

In case of a mismatch outcome of fine matching step 121, step 123 of locking the smart card 3 may be carried out, and access to secured environment E is immediately denied (step 106) or biometric characteristic detecting step 110 is returned to for a further identification attempt, preferably for no more than a selected number of times, as verified by step 116.

Figure 3:
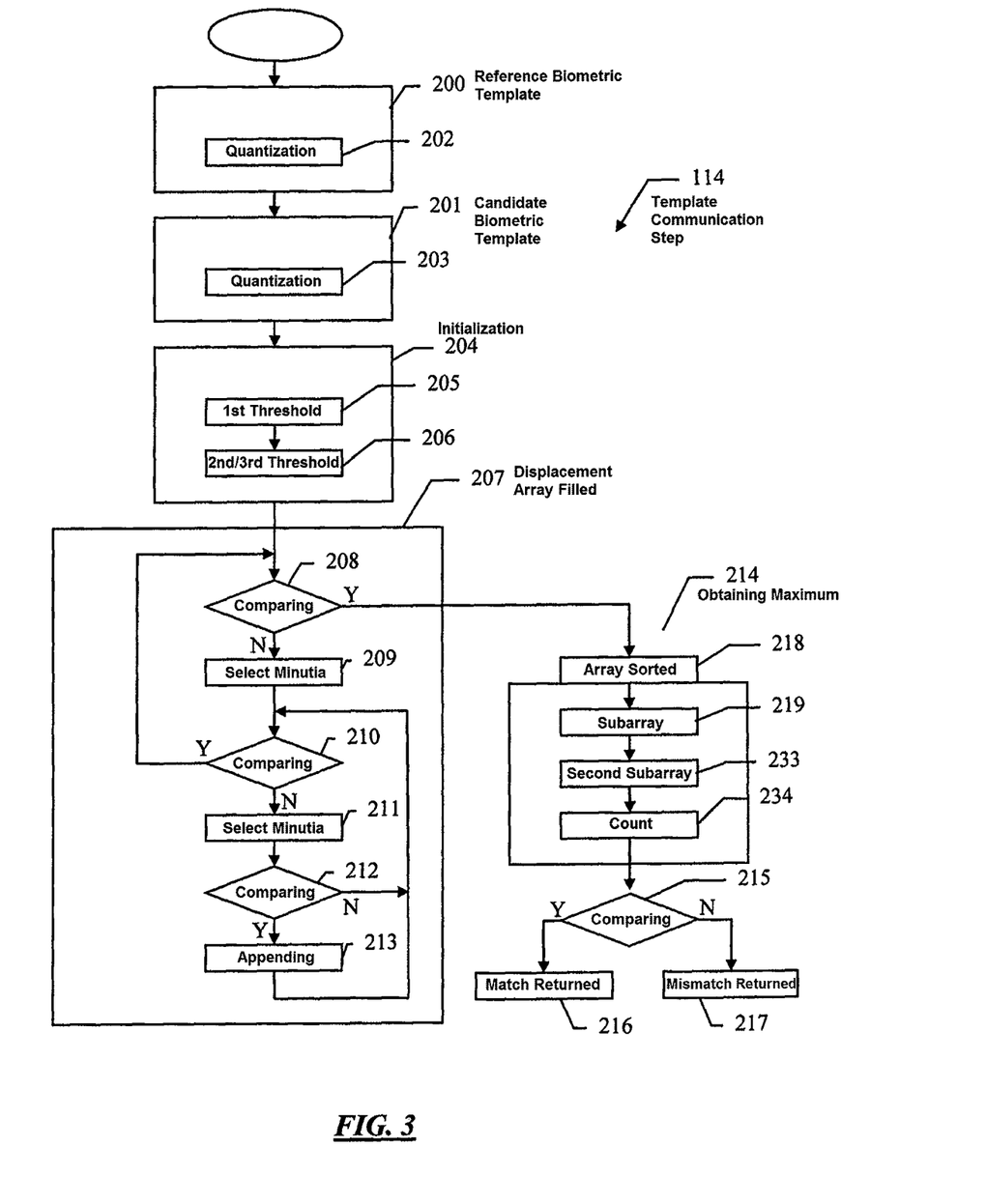
FIG. 3 shows a flow chart of a preferred embodiment of a matching method according to the invention.

A preferred embodiment of a biometric template matching method according to the invention for comparing the reference or enrolment biometric template 14 and the candidate biometric template 13 will now be described with reference to FIG. 3.

Because of the limited memory and computational capabilities the matching method requires, it is preferably used in matching step 115 when it is implemented by matching module 16 of the smart card 3, as the first or coarser matching step or as the single matching step of the biometrics based identification method. However, the matching method may advantageously be used also by non-restricted resource electronic devices, including biometrics based identification device 2.

The matching method is described hereinafter with reference to fingerprint identification.

The matching method relies on reference or enrolment biometric template 14 and candidate biometric template 13 being provided, in steps 200 and 201, respectively, with a specific data structure.

As briefly stated above, the data structure of each template 13, 14 comprises, for each minutia thereof, position data in the form of in-plane orthogonal coordinates, such as 2D Cartesian coordinates x, y, and orientation data t in the form of an in-plane angle with respect to axis X.

More specifically, each biometrics template 13 (14) can be an array of the short type, having size 3*M (3*N), wherein M (N) is the number of minutiae of the template 13 (14), and wherein, for $0 <= i < M$ ($0 <= i < N$):

item 3*i+0 is the abscissa x of the i-th minutia,
item 3*i+1 is the ordinate y of the i-th minutia,
item 3*i+2 is the orientation angle t of the i-th minutia.

While position data coordinates x, y may be expressed in whatever length units along axes X, Y, orientation data t is preferably quantized, namely orientation data t is expressed in a unit angle u defined by a preselected fraction of a perigon. Preferably, the preselected fraction of a perigon is $\frac{1}{32}$, i.e. 11.25°, as dictated by the minutiae extraction algorithms from NIST.

Because during the extraction of minutiae from the detected fingerprint (step 113 of the biometrics based identification method outlined above), the orientation of each minutia is typically obtained from a number of pixels of the original fingerprint image in the neighbourhood of the minutia point, using such a relatively large unit angle u reduces the error margin in later establishing whether two minutiae match in orientation. Indeed, a same minutia, thus having a same local orientation, will obtain a same quantized angle in two fingerprints despite of an absolute orientation difference within the angle unit, caused by a different orientation of the finger with respect to the biometric detector 9.

Accordingly, if a minutia of the candidate template 13 (enrolment template 14) is oriented along a direction forming angle α with axis X, its orientation data t will be set, in quantization steps 202 (203), as $$t = \lceil \frac{\alpha}{11.25} \rceil \quad (1)$$

wherein $\lceil . \rceil$ stands for integer part of.

Auxiliary data structures for use in the matching method as fully described hereinafter are then provided in initialization step 204, more specifically an empty 2D displacement array L is provided in step 205 and a first threshold tlim, a second threshold Range and a third threshold Mlim are provided in step 206.

Displacement array L can be an array of the short type, having size 2*D, wherein D is the number of displacement vectors between pairs of minutiae from the candidate template 13 and the enrolment template 14 selected according to a similarity criterion detailed below, and wherein, for 0<=i<D:

item 2*i+0 is the displacement Δx along abscissa x of the i-th minutia pair, indicated with w hereinbelow, item 2*i+1 is the displacement Δy along ordinate y of the i-th minutia pair, indicated with z hereinbelow.

Maximum size of displacement array L is in principle M*N, but it may be limited, for example, to 150 in order to speed up the execution of the matching method in a resource constrained environment such as processor 5 of smart card 3.

First threshold tlim is a number of unit angles u, preferably set to 1. Second threshold Range is a length in displacement vector space W, Z. Third threshold Mlim is a pure number Mlim<=M or Mlim<=min(M,N), wherein as above stated M is the number of minutiae of enrolment template 14, and N is the number of minutiae of candidate template 13. In particular, Mlim may be selected as a percentage of the number M of minutiae of enrolment template 14.

In step 207, displacement array L is then filled.

In an external cycle comprising M iterations, as schematized by a step 208 of comparing a pointer with M, one minutia from enrolment template 14 is selected (step 209), and in an internal cycle comprising N iterations, as schematized by a step 210 of comparing a pointer with M, one minutia from candidate template 13 is selected (step 211).

For each pair of minutiae m(xm,ym,tm), n(xn,yn,tn) selected in steps 209 and 211, an orientation data comparison is carried out (step 212), wherein it is checked whether the orientation data tm, tn of the two minutiae differ by no more than the first threshold tlim, i.e. whether $$|tm-tn|<=tlim \quad (2)$$

wherein |.| stands for absolute value of.

It is to be noted that the use of a threshold tlim in orientation data comparison is advantageous because of the relatively large unit angle u used in quantizing the orientation data of the minutiae of enrolment template 14 and candidate template 13. Indeed, almost equal angles such as angles differing by as few as one degree may be rounded off by formula (1) above into different angles expressed in the selected unit angle u. Would the comparison of step 212 be carried out as an equality check, the two minutiae would then be regarded as differing.

By way of an example, two minutiae oriented at 112° and 113°, respectively, will be represented in biometric templates 14, 13 by angles $$tm = \left\lceil \frac{112}{11.25} \right\rceil = 9 \quad (3)$$

$$tn = \left\lceil \frac{113}{11.25} \right\rceil = 10 \quad (4)$$

When the orientation data comparison step 212 has a positive outcome, a displacement vector V(w,z) is appended to displacement array L in step 213, wherein $$w=xm-xn \quad (5)$$

$$z=ym-yn \quad (6)$$

A pseudocode of an implementation of step 207 of filling the displacement array L is given below:

```
for each minutia m (xm,ym,tm) of enrolment template 14
    for each minutia n (xn,yn,tn) of candidate template 13
        if |tm-tn|<=tlim
            calculate V (xm - xn, ym - yn)
            append V to L
```

Figure 5:
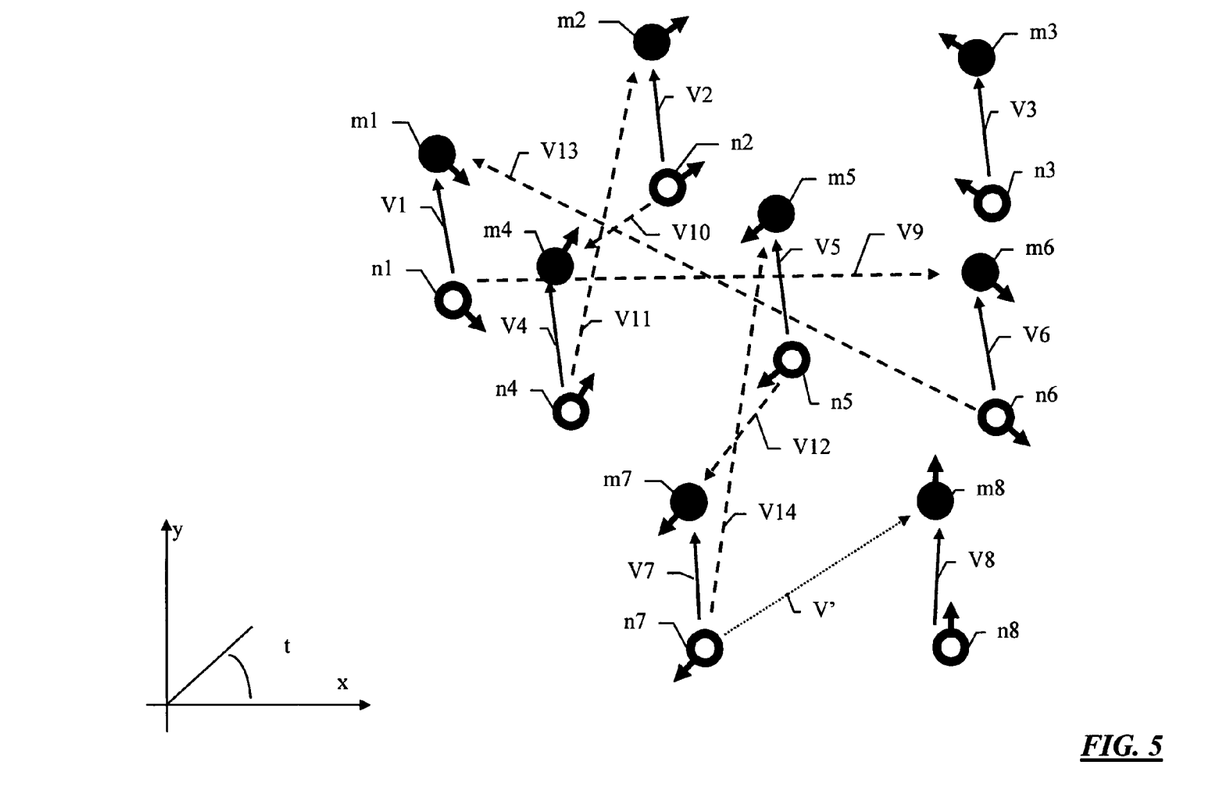
Figure 6:
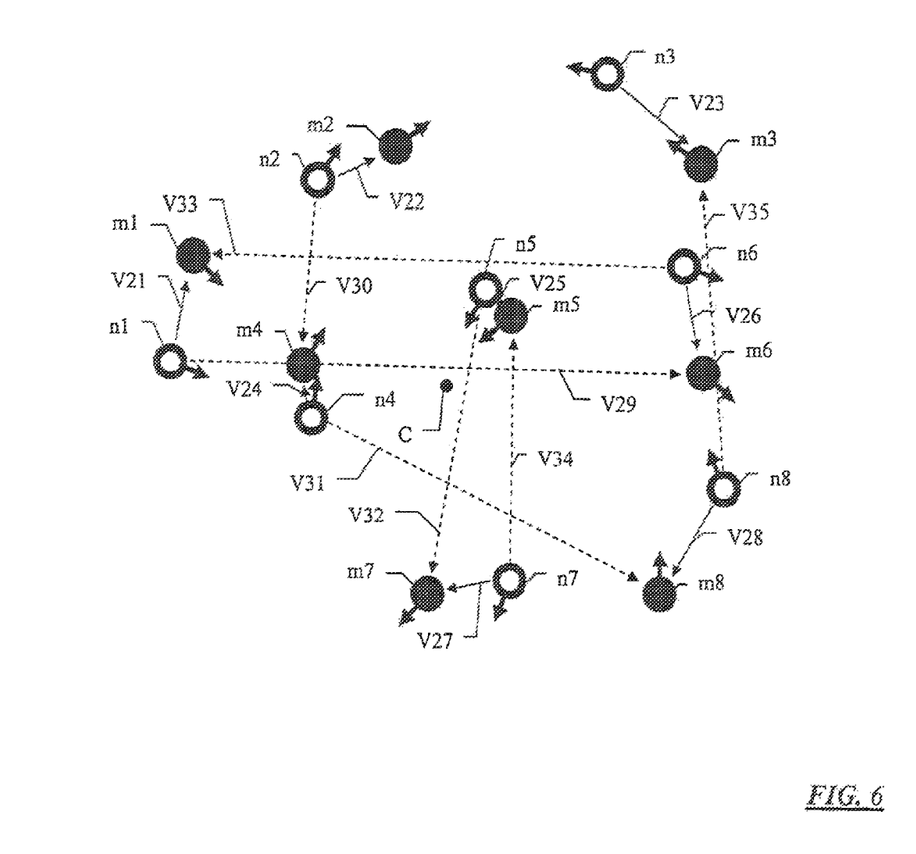

The significance of the above steps and of the steps to be described of the matching method may be better understood with reference to FIGS. 5 and 6.

In such figures, M=8 minutiae m1 to m8 of enrolment template 14 are represented by solid shapes, while N=8 minutiae n1 to n8 from candidate template 13 are represented by empty shapes. It is however to be noted that the numbers M, N of minutiae in the two templates will not necessarily be always equal.

Displacement vectors V1 to V14 and V21 to V35 between pairs of similar minutiae, as evaluated in minutiae orientation comparison step 212, are shown in solid line and in hatched lines, for reasons that will be clear hereinafter. Those displacement vectors V are appended to displacement array L in step 213. Conversely, displacement vectors between pairs of non similar minutiae, such as the exemplary vector V' shown in dotted lines between minutiae n7 and m8 in FIG. 5, are neither calculated nor appended to displacement array L.

Thus, while in principle M*N displacement vectors between pairs of minutiae from the two templates 13, 14 exist, the matching method of the invention reduces the number of considered displacement vectors by first performing minutiae orientation data comparison step 212.

For illustrative purposes, the two templates 13, 14 of FIGS. 5 and 6 are perfectly matching templates, i.e. they comprise exactly the same minutiae. In FIG. 5, candidate template 13 is merely shifted with respect to enrolment template 14, while in FIG. 6, candidate template 13 is merely rotated with respect to the same enrolment template 14 about centre C.

Displacement vectors V1 to V8 and V21 to V28 between pairs of actually corresponding pairs n1,m1; n2,m2; . . . n8,m8 of minutiae from the two templates 13, 14 are shown in solid lines, while displacement vectors V9 to V14 and V29 to V35 are shown in hatched lines.

It will be seen that in FIG. 5, displacement vectors V1 to V8 have the same length and oriented direction, and indeed each of them represents the actual translation of enrolment template 14 into candidate template 13. Vectors V9 to V14, on the other hand, differ in length and/or oriented direction, because they result from pairs of minutiae n1,m6; n2,m4; n4,m2; n5,m7; n6,m1; n7,m5 just happening to have the same or similar orientation.

It will be easily understood that, in principle, when a finger is merely translated during detection of the candidate template with respect to the position it had at the time of enrolment, there will be a number of identical displacement vectors corresponding to the minimum of M and N, if M and N are not equal because part of the finger falls outside the biometric detector 9. On the other hand, the number of spurious displacement vectors, such as vectors V9 to V14, will be statistically less, and any subset of identical spurious vectors will comprise less vectors.

In a real life condition, even considering a pure translation of the two templates, solid line displacement vectors V1 to V8 between actually corresponding pairs of minutiae n1,m1; n2,m2; . . . n8,m8 from the two templates 13, 14 may indeed slightly differ in length and/or oriented direction due to the computations carried out for extracting the minutiae from the detected fingerprint (step 113 of the biometrics based identification method outlined above).

Moreover, in case of a rotation between templates 13, 14 (FIG. 6), solid line displacement vectors V21 to V28, though being between actually corresponding pairs of minutiae n1,m1; n2,m2; . . . n8,m8 from the two templates 13, 14, differ both in length and in oriented direction. In particular, they will be chords of circumferences centred about the centre of rotation C, and passing through the minutiae pairs. Still, they are more similar in length—and to a less critical degree in oriented direction—than subsets of spurious displacement vectors V29 to V35 between pairs of minutiae n1,m6; n2,m4; n4,m8; n5,m7; n6,m1; n7,m5; n8,m3 that just happen to have the same or similar orientation.

Again, in principle, when a finger is merely rotated during detection of the candidate template with respect to the position it had when the enrolment template was detected, there will be a number of displacement vectors that have similar length and oriented direction corresponding to the minimum of M and N, if M and N are not equal because part of the finger falls outside the biometric detector, while the number of spurious displacement vectors, such as vectors V29 to V35, will be statistically less, and any subset of identical spurious vectors will comprise less vectors.

In a real life condition, candidate template 13 will be both translated and rotated with respect to enrolment template 14. It will be understood that the above principles still hold, that in case the two templates 13, 14 come from a same user's finger, there will be a number of displacement vectors between actually corresponding pairs of minutiae only slightly differing in length and oriented direction that is larger than subsets of spurious displacement vectors, and comparable to the minimum of M, N. Also, it will be easily understood that in case the two templates 13, 14 do not come from a same user's finger, the variance between displacement vectors will be very high, namely the number of displacement vectors only slightly differing in length and oriented direction will be low.

Based on the above considerations, the matching method comprises, after the steps outlined above, a step 214 of obtaining the maximum number Score of displacement vectors V differing by no more than the second threshold Range, described in more detail hereinafter, and a step 215 of comparing the maximum number Score with the third threshold Mlim.

In case the maximum number Score is equal to or above third threshold Mlim, a match is then returned in step 216, while in case the maximum number Score is below third threshold Mlim, a mismatch is then returned in step 217.

It is to be noted that threshold Range, that represents how similar two displacement vectors Vr, Vs should be in length and orientation, is in principle a two-dimensional threshold. Indeed, a difference in vectors is a vector $\Delta V$ itself. However, the orientation of the difference vector $\Delta V$ is not a concern, because what is important is the relative orientation of the two displacement vectors, not their absolute orientation. Thus, threshold Range need only amount to a vector length or size related threshold.

Because of the choice of the data structure representing displacement array V, wherein each displacement vector is represented in space W, Z by formulae (5) and (6) above, threshold Range may be expressed as a single figure, representing a limit of each coordinate W,Z of the difference vector $\Delta V$. The geometrical significance of such a displacement vector similarity criterion is imposing that the difference vector $\Delta V$ is inscribable in a square having side Range.

Two displacement vectors Vr(wr,zr), Vs(ws,zs) will accordingly differ by no more than the second threshold Range if $$\Delta w = |wr-ws| = |(xmi-xnj)-(xmk-xml)| <= \text{Range} \quad (7)$$

$$\Delta z = |zr-zs| = |(xmi-xnj)-(xmk-xml)| <= \text{Range} \quad (8)$$

If a different data structure is used for representing displacement vectors V, such as polar coordinates $\rho,\theta$, then threshold Range will be expressed as a single figure, representing a limit for radius coordinate $\rho$. The geometrical significance of such a displacement vector similarity criterion is imposing that the difference vector $\Delta V$ is inscribable in a circle having radius Range.

Step 214 of obtaining the maximum number Score of displacement vectors V differing by no more than the second threshold Range may be performed by comparing each pair of two displacement vectors Vr, Vs of displacement array L against threshold Range by formulae (7), (8) above, and counting the number of successes.

More advantageously, step 214 is performed through the following steps.

First, in step 218 displacement array L is sorted by coordinate W. This is preferably done using the well-known Insertion Sort algorithm, that does not require any auxiliary array in that two array items at a time are exchanged in place.

A first displacement subarray LW is then generated (step 219), being the longer subset of items of displacement array L whose W components differ by no more than second threshold Range according to formula (7) above, by browsing through displacement array L. Note that W-verified displacement subarray LW may be stored in the same memory location as displacement array L.

Figure 4:
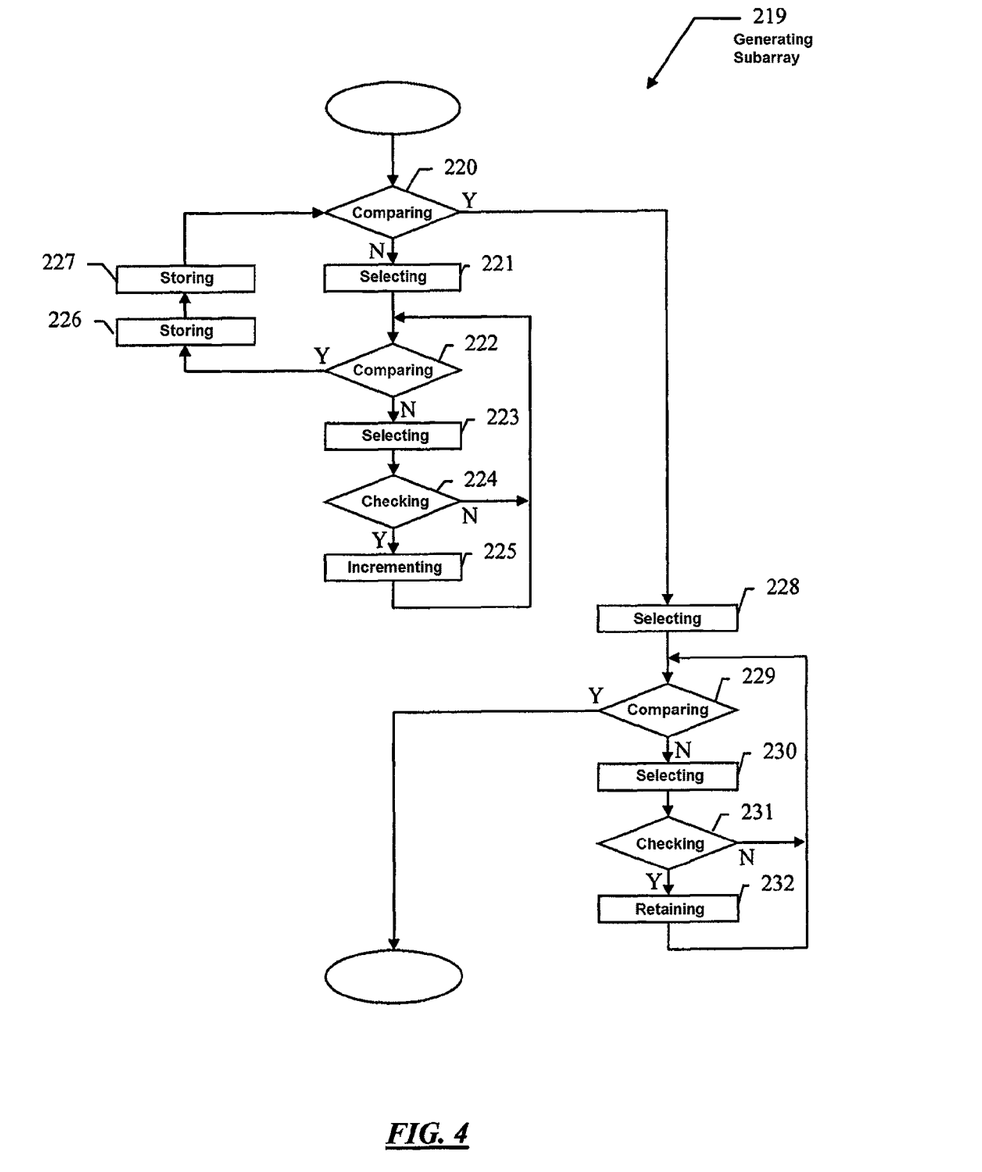
FIG. 4 shows a flow chart of a step of the matching method of FIG. 3, and FIGS. 5 and 6 are exemplary diagrammatical representations of an enrolment template and a candidate template superimposed.

FIG. 4 shows step 219 of generating the first or W-verified displacement subarray LW in greater detail. In an external cycle comprising a number of iterations equal to the number D of items of displacement array L less 1, as schematized by a step 220 of comparing a pointer r with D, one item Lr(wr,zr) of displacement array L is selected (step 221), and in an internal cycle comprising D-r iterations, as schematized by a step 222 of comparing a pointer s with D-r, a following item Vs(ws,zs) of displacement array L is selected (step 223). Formula (7) is then checked in step 224, and if the check has a positive outcome, a Current Length variable is incremented in step 225. At the end of the internal cycle, a Maximum Length variable is stored in step 226 as the maximum of Current Length and Maximum Length previously stored, and a Max_W_index is stored in step 227 as current index r or previously stored index Max_W_index, respectively.

It is noted that, to minimize execution time, the internal and external cycles may also be ended when the number of pairs to be processed, added to Current Length, would not exceed Maximum Length.

At the end of the external cycle 220, item Lr(wr,zr) with r=Max_W_index of displacement array L is selected and retained in W-verified displacement subarray VW (step 228). Then displacement array L is browsed again. In a cycle comprising a number of iterations equal at most to D-r, as schematized by a step 229 of comparing a pointer s with D, a following item Vs(ws,zs) of displacement array L is selected (step 230).

Formula (7) is then checked in step 231, and if the check has a positive outcome, item Vs(ws,zs) is retained in W-verified displacement subarray VW in step 232. Returning to FIG. 3, a second displacement subarray LWZ is then generated (step 233), being the longer subset of items of the first displacement subarray LW whose Z components differ by no more than second threshold Range according to formula (8) above, by browsing through W-verified displacement subarray LW. Note that the second displacement subarray LWZ may be stored in the same memory location as displacement array V and the first displacement subarray LW. Step 233 may be performed as step 219 detailed above, mutatis mutandis.

The number of items of the second displacement subarray LWZ is then counted in step 234 and it is the maximum number Score to be used in comparison step 215.

It will be understood that the selection of the value of threshold Range is critical to the performance of the matching method. If too large a value is selected, displacement vectors between not actually corresponding pairs of minutiae from enrolment template 14 and candidate template 13 will be considered similar, and the rate of false matches will increase. Conversely, if too small a value is selected, displacement vectors between actually corresponding pairs of minutiae from enrolment template 14 and candidate template 13 will be considered not similar because of the translation and rotation of the finger during detection of the candidate template 13 with respect to the position it had at the time of enrolment, and the rate of false mismatches will increase.

The matching method according to the present invention can also be applied to candidate and enrolment templates 13, 14 comprising 3D position data, such as in case the biometric characteristic is the user's hand, face or iris.

The invention claimed is:

1. A biometric template matching method, comprising:
providing to a microprocessor a reference biometric template and a candidate biometric template, each template comprising position data and orientation data of a respective plurality of minutiae;
comparing the orientation data of each minutia from the candidate biometric template with the orientation data of each minutia from the reference biometric template;
when the orientation data of a selected pair of one minutia from the candidate biometric template and one minutia from the reference biometric template differ by no more than a first threshold, determining a displacement vector representative of a difference in position data of the selected pair of minutiae;
determining a maximum number of displacement vectors that differ from each other by less than a second threshold, wherein each displacement vector comprises a first coordinate and a second coordinate, wherein the displacement vectors are stored in a displacement array, and wherein determining the maximum number of displacement vectors comprises:
sorting the displacement array by the first coordinate of the displacement vectors;
generating a first displacement subarray being a longer subset of items of displacement array, the first coordinates of which differ by no more than said second threshold;
generating a second displacement subarray, being a longer subset of items of the first displacement subarray, the second coordinates of which differ by no more than said second threshold; and
counting a number of items of the second displacement subarray;
comparing said maximum number of displacement vectors with a third threshold; and
if said maximum number of displacement vectors is less than said third threshold, returning a mismatch, otherwise returning a match.

2. The method according to claim 1, wherein, in providing templates, said position data comprise in-plane orthogonal coordinates.

3. The method according to claim 1, wherein, in providing templates, said orientation data comprise an in-plane angle with respect to a reference axis.

4. The method according to claim 3, wherein said in-plane angle is expressed in a unit angle that is a preselected fraction of a perigon.

5. The method according to claim 4, wherein said preselected fraction of a perigon is 1/32.

6. The method according to claim 4, wherein said first preselected threshold is one angle unit.

7. The method according to claim 1, wherein a third preselected threshold is a function of a number of minutiae in the reference biometric template.

8. The method according to claim 7, wherein said third preselected threshold is a percentage of the number of minutiae in the reference biometric template.

9. A biometrics based identification method, comprising an enrollment step comprising providing at least one reference biometric template of a user, and an identification step, comprising:
obtaining at least one candidate biometric template representative of at least one biometric characteristic of a purported user;
comparing the at least one reference template and the at least one candidate template;
in case of a match, granting a purported user access to a secured environment; and
in case of a mismatch, denying the purported user access to a secured environment,
wherein comparing the at least one reference template and the at least one candidate template, comprises the matching method according to claim 1.

10. The method according to claim 9, wherein comparing the at least one reference template and the at least one candidate template, is at least partly carried out by a portable data carrier with microprocessor.

11. The method according to claim 10, further comprising, in case of a match, unlocking access to the portable data carrier with microprocessor.

12. The method according to claim 11, wherein a first comparing of the at least one reference template and the at least one candidate template, is carried out by a portable data carrier with microprocessor, and an at least one second comparing of the at least one reference template and the at least one candidate template is carried out by a biometrics based identification device.

13. The method according to claim 12, further comprising communicating at least one reference template from said portable data carrier with microprocessor to said biometrics based identification device in case of a match in said first comparing of the at least one reference template and the at least one candidate template.

14. The method according to claim 10, further comprising, in case of a mismatch, locking access to said portable data carrier with microprocessor.

15. The method according to claim 9, wherein said obtaining at least one candidate template comprises a minutiae extraction step.

16. A portable data carrier with microprocessor, comprising modules capable of being adapted to carry out the matching method of claim 1.

17. A biometrics based identification system, comprising a biometrics based identification device and at least one portable data carrier with microprocessor capable of being adapted to carry out the identification method of claim 9.

18. A biometrics based identification method, comprising an enrollment step, comprising storing at least one reference biometric template of a user in a portable data carrier with microprocessor, and an identification step comprising:

bringing into electronic communication said portable data carrier with microprocessor with a biometrics based identification device;

providing to said portable data carrier with microprocessor a candidate biometric template of a purported user, the candidate biometric template and reference biometric template each comprising position data and orientation data of a respective plurality of minutiae;

comparing one reference template and said candidate template within said portable data carrier with microprocessor;

when the orientation data of a selected pair of one minutia from the candidate template and one minutia from the reference template differ by no more than a first threshold, determining a displacement vector representative of a difference in position data of the selected pair of minutiae;

determining a maximum number of displacement vectors that differ from each other by less than a second threshold, wherein each displacement vector comprises a first coordinate and a second coordinate, wherein the displacement vectors are stored in a displacement array and wherein determining the maximum number of displacement vectors comprises:

sorting the displacement array by a first coordinate of the displacement vectors;

generating a first displacement subarray being a longer subset of items of displacement array, the first coordinates of which differ by no more than said second threshold;

generating a second displacement subarray, being a longer subset of items of the first displacement subarray, the second coordinates of which differ by no more than said second threshold; and counting a number of items of the second displacement subarray;

comparing said maximum number of displacement vectors with a third threshold; and if said maximum number of displacement vectors is less than said third threshold, returning a mismatch, otherwise returning a match.

* * * * *